United States Patent
Mujumdar et al.

(10) Patent No.: US 12,242,797 B2
(45) Date of Patent: Mar. 4, 2025

(54) CORPUS QUALITY PROCESSING FOR A SPECIFIED TASK

(71) Applicant: INTERNATIONAL BUSINESS MACHINES CORPORATION, Armonk, NY (US)

(72) Inventors: Shashank Mujumdar, Nagpur (IN); Vitobha Munigala, Secunderabad (IN); Hima Patel, Bengaluru (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 102 days.

(21) Appl. No.: 18/164,661

(22) Filed: Feb. 6, 2023

(65) Prior Publication Data

US 2024/0265196 A1    Aug. 8, 2024

(51) Int. Cl.
G06F 17/00 (2019.01)
G06F 40/151 (2020.01)
G06F 40/166 (2020.01)

(52) U.S. Cl.
CPC .......... *G06F 40/166* (2020.01); *G06F 40/151* (2020.01)

(58) Field of Classification Search
CPC ............................. G06F 40/166; G06F 40/151
USPC ......................................................... 715/256
See application file for complete search history.

(56) References Cited

U.S. PATENT DOCUMENTS 7,711,660 B1   5/2010   Gentile et al.
10,387,564 B2  8/2019   Ananthanarayanan et al.
10,586,615 B2* 3/2020   Bastide ................. G16H 10/20
2011/0219012 A1* 9/2011  Yih ......................... G06F 16/00
                                                        706/12
2013/0055042 A1 2/2013   Al Za'noun et al.

(Continued)

FOREIGN PATENT DOCUMENTS

EP     2615574 A1    7/2013

OTHER PUBLICATIONS

Agarwal, Oshin, et al. "Knowledge graph based synthetic corpus generation for knowledge-enhanced language model pre-training." arXiv preprint arXiv:2010.12688 (2020) (Year: 2020).*

(Continued)

*Primary Examiner* — Andrew T McIntosh
(74) *Attorney, Agent, or Firm* — Lily Neff, Esq; Kevin P. Radigan, Esq.; Heslin Rothenberg Farley & Mesiti P.C.

(57) ABSTRACT

Processing within a computing environment is facilitated using a corpus processing system to assess and enhance quality of a corpus of unstructured documents for a specified task. The processing includes referencing, by a corpus processing engine, the corpus of unstructured documents to obtain unstructured document data, and applying, by a corpus quality metrics engine, a set of quality metrics to the document data to obtain a set of quality metric scores. Further, the process includes automatically selecting, by a quality metric selection engine, a subset of task-relevant quality metrics using the quality metric scores and the specified task, and automatically transforming, at least in part, multiple documents of the corpus to remediate one or more identified issues with the documents. The automatically transforming results in remediated documents tuned for the specified task, which are provided for the specified task to be performed.

20 Claims, 10 Drawing Sheets

(56) References Cited

U.S. PATENT DOCUMENTS

2014/0229456 A1    8/2014    Hollifield et al.
2020/0160190 A1*    5/2020    Swamy ................ G06F 40/279
2020/0387571 A1*    12/2020    Delima ................. G06N 5/022

OTHER PUBLICATIONS

Kaisser, Michael. "Acquiring syntactic and semantic transformations in question answering." (2010) (Year: 2010).*

Anonymous, "System and Method to Evaluate Content Quality Based on a Corpus", ip.com, IP.com No. IPCOM000266571D, published Jul. 29, 2021, https://priorart.ip.com/IPCOM/000266571 (7 pages) (Year: 2021).

Gupta et al., "Data Quality Toolkit: Automatic Assessment of Data Quality and Remediation for Machine Learning Datasets", Cornell University, published Aug. 12, 2021, https://arxiv.org/abs/2108.05935 (9 pages) (Year: 2021).

Heinrich et al., "Requirements for Data Quality Metrics", Journal of Data and Information Quality, 9, 2, Art. 12, published Jan. 22, 2018, https://dl.acm.org/doi/10.1145/3148238, https://www.researchgate.net/publication/322647767 (32 pages) (Year: 2018).

Mylavarapu, Sesha Sai Goutam Sarma, "Context-Aware Quality Assessment of Structured and Unstructured Data", Doctoral Thesis, Graduate College of Oklahoma State University, published Jul. 2020, https://shareok.org/handle/11244/328620 (124 pages) (Year: 2020).

Saroja, Shalini Chellathurai, "Measurement of the Quality of Structured and Unstructured Data Accumulating in the Product Life Cycle in a Data quality Dashboard", Universitat Stuttgart, Germany, Master Thesis Nr. 0990-0004, published Feb. 10, 2017, https://elib.uni-stuttgart.de/handle/11682/9328 (79 pages) (Year: 2017).

Taleb et al., "Big Data Quality Assessment Model for Unstructured Data", ResearchGate, published Nov. 18, 2018, https://www.researchgate.net/publication/329360087 (6 pages) (Year: 2018).

* cited by examiner

CORPUS QUALITY PROCESSING FOR A SPECIFIED TASK

BACKGROUND

One or more aspects relate, in general, to enhancing processing within a computing environment, and in particular, to assessing and tuning quality of unstructured electronic documents to facilitate a specified task of a computing environment, such as a machine learning task.

Machine-learning provides computers with the ability to learn, or continue learning, without being pre-programmed. Machine-learning utilizes algorithms that learn from data, such as a corpus of documents, and create insights based on the data, such as making predictions or decisions.

Enterprise systems can collect, produce, obtain, unstructured electronic documents containing rich information suitable for a variety of different tasks, including machine learning. In a practical setting, there can be various types of unstructured documents, such as PDF documents, HTML logs, XML logs, ticket data, product reviews, publications, communications, etc.

SUMMARY

Certain shortcomings of the prior art are overcome, and additional advantages are provided herein through the provision of a computer-implemented method of facilitating processing within a computing environment. The computer-implemented method includes: using a corpus processing system to facilitate assessing and enhancing quality of a corpus of unstructured documents to facilitate a specified task to be performed. The using includes referencing, by a corpus processing engine, the corpus of unstructured documents to obtain document data, and applying, by a corpus quality metrics engine, a set of quality metrics to the document data to obtain a set of quality metric scores for the unstructured documents of the corpus. The computer-implemented method further includes automatically selecting, by a quality metrics selection engine, a subset of task-relevant quality metrics from the set of quality metrics using the set of quality metric scores and the specified task, and automatically transforming, at least in part, multiple documents of the corpus to remediate one or more identified issues with the multiple documents, the automatically transforming resulting in remediated documents tuned for the specified task, where the one or more issues are identified by the subset of task-relevant quality metrics. Further, the method includes providing the remediated documents for the specified task to be performed.

Computer systems and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The accompanying figures, which are incorporated in and form a part of this specification, further illustrate the present invention and, together with this detailed description of the invention, serve to explain aspects of the present invention. Note in this regard that descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects or features are disclosed herein, and unless inconsistent, each disclosed aspect or feature is combinable with any other disclosed aspect or feature as desired for a particular application of the concepts disclosed.

Note also that illustrative embodiments are described below using specific code, designs, architectures, protocols, layouts, schematics, or tools only as examples, and not by way of limitation. Furthermore, the illustrative embodiments are described in certain instances using particular software, hardware, tools, or data processing environments only as example for clarity of description. The illustrative embodiments can be used in conjunction with other comparable or similarly purposed structures, systems, applications, or architectures. One or more aspects of an illustrative embodiment can be implemented in software, hardware, or a combination thereof.

Figure 1:
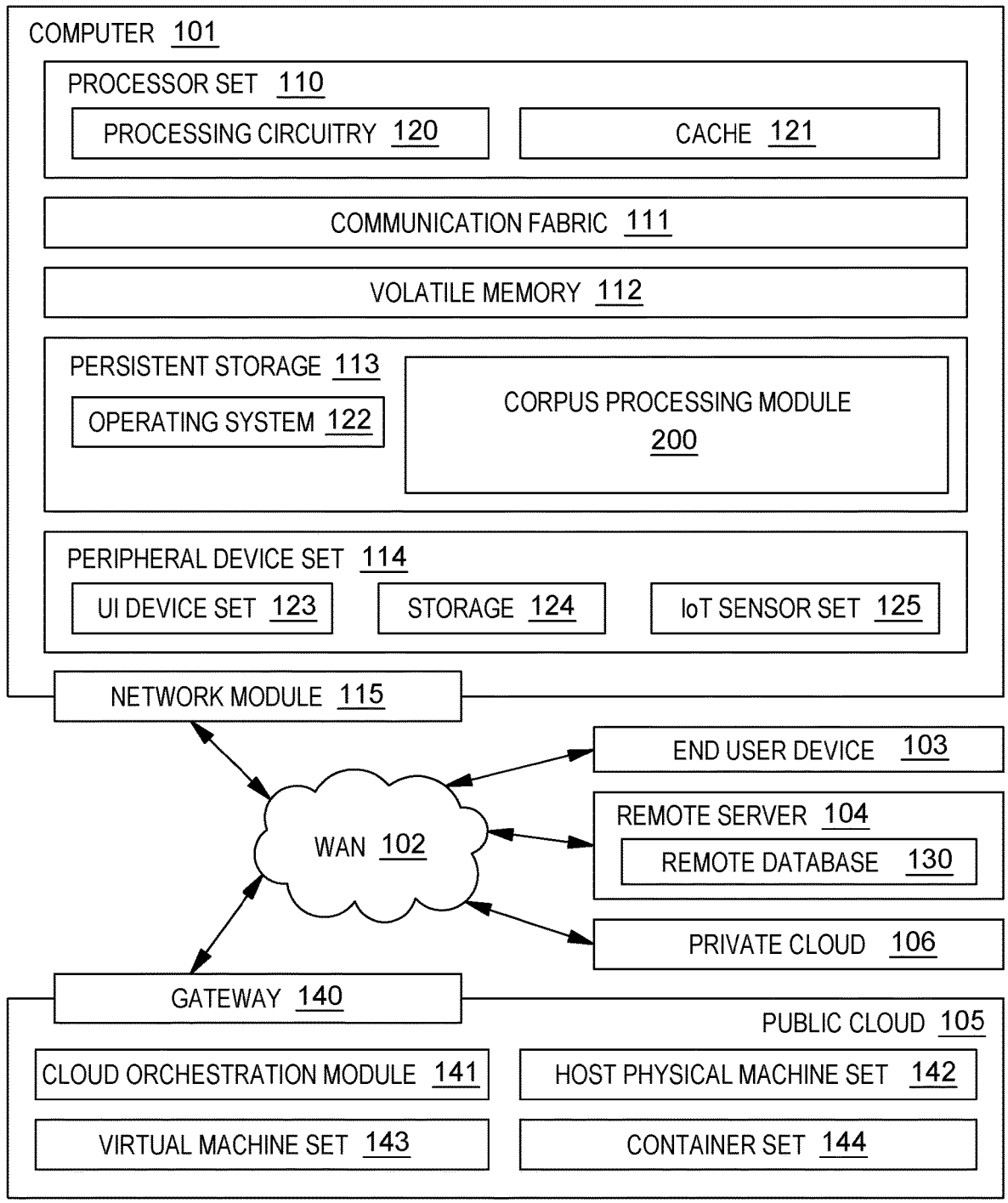
FIG. 1 depicts one example of a computing environment to include and/or use one or more aspects of the present invention.

As understood by one skilled in the art, program code, as referred to in this application, can include software and/or hardware. For example, program code in certain embodiments of the present invention can utilize a software-based implementation of the functions described, while other embodiments can include fixed function hardware. Certain embodiments combine both types of program code. Examples of program code, also referred to as one or more programs, are depicted in FIG. 1, including operating system 122 and corpus processing module 200, which are stored in persistent storage 113.

One or more aspects of the present invention are incorporated in, performed and/or used by a computing environment. As examples, the computing environment can be of various architectures and of various types, including, but not limited to: personal computing, client-server, distributed, virtual, emulated, partitioned, non-partitioned, cloud-based, quantum, grid, time-sharing, clustered, peer-to-peer, mobile, having one node or multiple nodes, having one processor or multiple processors, and/or any other type of environment and/or configuration, etc., that is capable of executing a process (or multiple processes) that, e.g., perform automated container name identification processing, such as disclosed herein. Aspects of the present invention are not limited to a particular architecture or environment.

Prior to further describing detailed embodiments of the present invention, an example of a computing environment to include and/or use one or more aspects of the present invention is discussed below with reference to FIG. 1.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as corpus processing module block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 126 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present invention. Other examples are possible. Further, in one or more embodiments, one or more of the components/modules of FIG. 1 need not be included in the computing environment and/or are not used for one or more aspects of the present invention. Further, in one or more embodiments, additional and/or other components/modules can be used. Other variations are possible.

Figure 2:
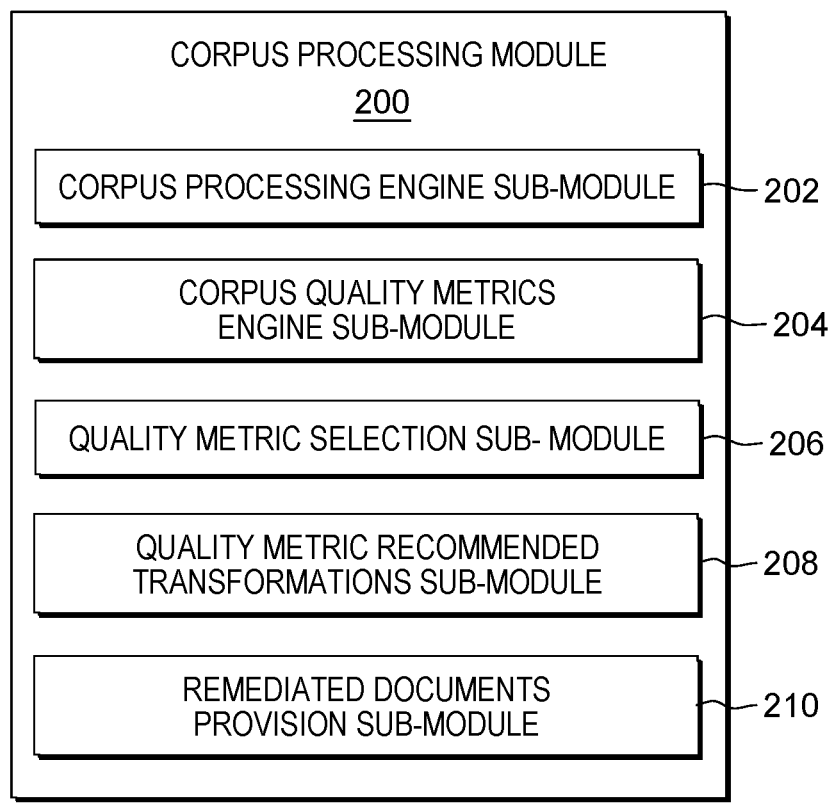
FIG. 2 depicts one embodiment of a computer program product with a corpus processing module, in accordance with one or more aspects of the present invention.
Figure 3:
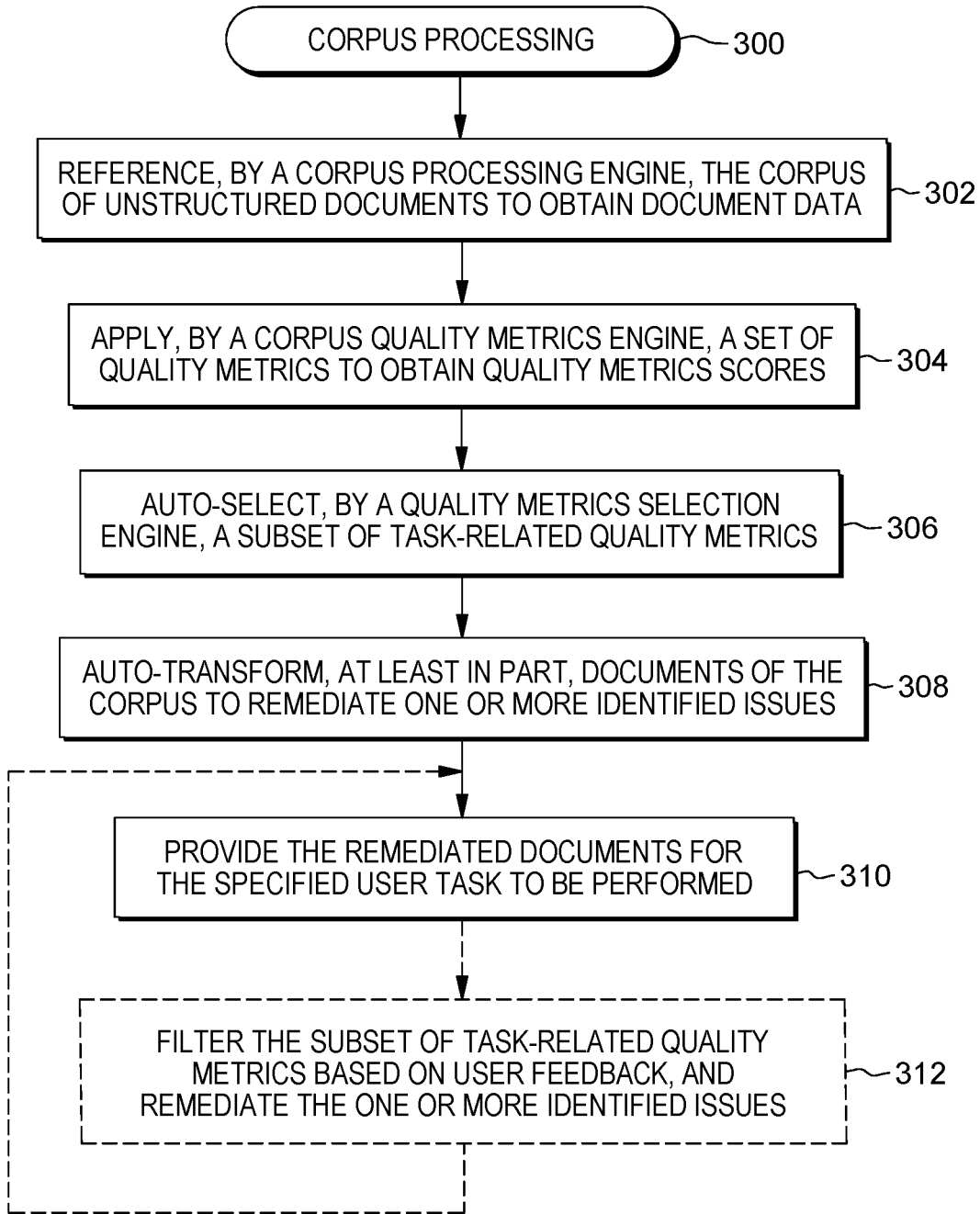
FIG. 3 depicts one embodiment of corpus processing, in accordance with one or more aspects of the present invention.

By way of example, one or more embodiments of a corpus processing module and process are described initially with reference to FIGS. 2-3. FIG. 2 depicts one embodiment of corpus processing module 200 that includes code or instructions to perform corpus processing, in accordance with one or more aspects of the present invention, and FIG. 3 depicts one embodiment of a corpus processing or tuning process, in accordance with one or more aspects of the present invention.

Referring to FIGS. 1 & 2, corpus processing module 200 includes, in one example, various sub-modules used to perform corpus processing, in accordance with one or more aspects of the present invention. The sub-modules are, e.g., computer-readable program code (e.g., instructions) and computer-readable media (e.g., persistent storage (e.g., persistent storage 113, such as a disk) and/or a cache (e.g., cache 121), as examples). The computer-readable media can be part of a computer program product and can be executed by and/or using one or more computers, such as computer(s) 101; processors, such as a processor of processor set 110; and/or processing circuitry, such as processing circuitry of processor set 110, etc.

In the FIG. 2 embodiment, example sub-modules of corpus processing module 200 are used to facilitate assessing and enhancing quality of a corpus of unstructured electronic documents to facilitate a specified user task to be performed, that is, using documents of the corpus. The example sub-modules of corpus processing module 200 include, for instance, a corpus processing engine sub-module 202 to reference the corpus of unstructured electronic documents and obtain document data; a corpus quality metrics engine sub-module 204 to apply a set of quality metrics to the document data to obtain a set of quality metrics scores for the documents; a quality metrics selection sub-module 206 to automatically select a subset of task-relevant quality metrics from the applied set of quality metrics using the set of quality metrics scores and the specified user task; a quality metrics recommended transformation sub-module 208 to automatically transform, at least in part, one or more documents of the corpus to remediate one or more identified issues with the document(s), where the automatically transforming results in remediated electronic documents tuned for the specified user task, and where the one or more issues are identified by the subset of task-relevant quality metrics; and a remediated documents provision sub-module 210 for providing the remediated documents for the specified user task to be performed. Advantageously, using corpus processing module 200 facilitates assessing and enhancing quality of a corpus of unstructured documents for a specified user task to be performed. Note that although various sub-modules are described, corpus processing such as disclosed herein can use, or include, additional, fewer, and/or different sub-modules. A particular sub-module can include additional code, including code of other sub-modules, or less code. Further, additional and/or other modules can be used. Many variations are possible.

In one or more embodiments, the sub-modules are used, in accordance with one or more aspects of the present invention, to perform corpus quality processing. FIG. 3 depicts one example of an automated process for processing a corpus of unstructured documents, such as disclosed herein. The process is executed, in one or more examples, by a computer (e.g., computer 101 (FIG. 1)), and/or a processor or processing circuitry (e.g., of processor set 110 of FIG. 1). In one example, code or instructions implementing the process, are part of a module, such as corpus processing module 200. In other examples, the code can be included in one or more other modules and/or in one or more submodules of the one or more other modules. Various options are available.

As one example, corpus processing 300 executes on a computer (e.g., computer 101 of FIG. 1), a processor (e.g., a processor of processor set 110 of FIG. 1), and/or processing circuitry (e.g., processing circuitry of processor set 110), to facilitate assessing and enhancing quality of a corpus of unstructured electronic documents for a specified user task to be performed using the corpus. The process includes, in one or more embodiments, processing to reference, by a corpus processing engine, the corpus of unstructured documents to obtain document data 302, and to apply, by a corpus quality metrics engine, a set of quality metrics to obtain quality metrics scores for the unstructured documents of the corpus 304. The process further auto-selects, by a quality metrics selection engine, a subset of task-relevant quality metrics from the set of quality metrics using the set of quality metrics scores and the specified user task 306. The process also automatically transforms, at least in part, multiple documents of the corpus to remediate one or more identified issues with the multiple documents, where the automatically transforming results in remediated documents tuned for the specified user task, and the one or more issues are identified from the subset of task-relevant quality metrics 308. The remediated documents are provided for the specified user task to be performed 310, such as, for instance, as a machine learning training dataset for training a machine learning model for a particular application, and/or other artificial intelligence-based processing 310. Optionally, the subset of task-relevant quality metrics is filtered based on, for instance, user feedback, and the one or more identified issues are further remediated using the filtered subset of task-relevant quality metrics 312, with the remediated data then being provided for the specified user task to be performed.

Advantageously, a novel corpus processing system is provided herein which receives as input a corpus of unstructured documents and a set of quality metrics, such as available in a data quality metrics library, as well as data identifying a user-specified task to be performed, and automatically identifies a subset of task-relevant quality metrics, from the available repository of metrics, which are a best fit for the specified task. Further, the corpus processing system automatically transforms, at least in part, one or more documents, to remediate one or more identified issues with the documents identified by the subset of task-relevant quality metrics. In one or more embodiments, the corpus processing can be enhanced by, for instance, receiving one or more user-specified constraints, such as constraints on time, model performance, quality score, etc., to make suitable recommendations for the data quality metrics from the identified subset of task-relevant quality metrics for the specified task. In one or more implementations, the corpus processing disclosed herein, at least in part, automatically identifies relevant data quality metrics for documents in the corpus of unstructured documents for the specified task. The corpus processing system automatically determines, in one embodiment, the applicability and significance of various semantic, syntactic, structural, and/or metadata-related quality metrics for various documents in the corpus based on knowledge of the user-specified task. In one embodiment, the corpus processing system incorporates user constraints and/or feedback to enable the user to assist in selecting, or in directing, the data quality metrics selection and automatic remediation of identified issues. In one or more implementations, the corpus processing system can retain data quality metric designs to incorporate user-defined data quality metrics within the metric repository for future use.

In one or more embodiments, remediated electronic documents for the specified task to be performed can be, or be included in, a training dataset for training, for instance, a machine learning model for a particular user-specified application. Prior to describing one or more embodiments of the corpus processing system and method further, FIG. 4 further describes aspects of machine learning modeling, which can be used in association with one or more aspects of the present invention.

Figure 4:
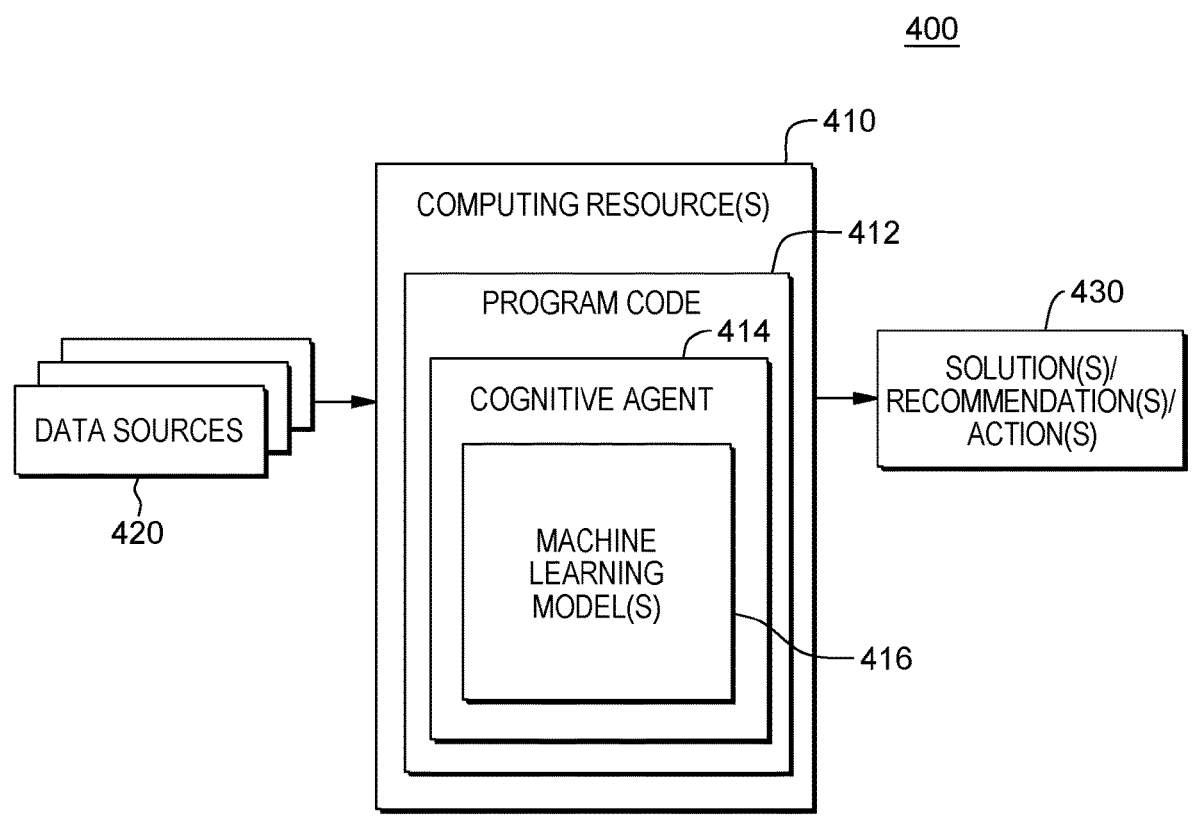
FIG. 4 is a further example of a computing environment to include and/or use one or more aspects of the present invention.

FIG. 4 depicts another embodiment of a computing environment or system 400, which can incorporate, or implement, one or more aspects of an embodiment of the present invention. In one or more implementations, system 400 is implemented as part of a computing environment, such as computing environment 100 described above in connection with FIG. 1. System 400 includes one or more computing resources 410 that execute program code 412 that implements, for instance, one or more aspects of a corpus processing module or facility such as disclosed herein, and which includes a cognitive engine or agent 414, which utilizes one or more machine learning models 416, such as described herein. Data, such as the corpus of unstructured documents, the set of quality metrics data, the identified user task, the remediated documents, or other data associated with execution of a corpus processing system such as disclosed herein and/or associated with training a user-specified machine learning model, is used by cognitive agent 414, to train model(s) 416, such as one or more machine learning models implementing, for instance, the corpus processing engine, corpus quality metrics engine, quality metrics selection engine, etc., described herein, to facilitate assessing and enhancing quality of the corpus of unstructured documents for the specified user task to be performed, such as, for instance, enhancing a training dataset to be used in training a user-specified machine learning model, and/or to provide other related solutions, recommendations, and/or actions 430, etc. In implementation, system 400 can include, or utilize, one or more networks for interfacing various aspects of computing resource(s) 410, as well as one or more data sources 420 providing data, and one or more components, systems, etc., receiving an output, action, etc., 430 of machine learning model(s) 416, such as to facilitate performance of one or more corpus processing operations. By way of example, the network(s) can be, for instance, a telecommunications network, a local-area network (LAN), a wide-area network (WAN), such as the Internet, or a combination thereof, and can include wired, wireless, fiber-optic connections, etc. The network(s) can include one or more wired and/or wireless networks that are capable of receiving and transmitting data, including training data for the machine-learning model, and an output solution, recommendation, action, of the machine-learning model, such as discussed herein.

In one or more implementations, computing resource(s) 410 house and/or execute program code 412 configured to perform methods in accordance with one or more aspects of the present invention. By way of example, computing resource(s) 410 can be a computing-system-implemented resource(s). Further, for illustrative purposes only, computing resource(s) 410 in FIG. 4 is depicted as being a single computing resource. This is a non-limiting example of an implementation. In one or more other implementations, computing resource(s) 410, by which one or more aspects of corpus processing, such as discussed herein can, at least in part, be implemented in multiple separate computing resources or systems, such as one or more computing resources of a cloud-hosting environment, by way of example.

Briefly described, in one embodiment, computing resource(s) 410 can include one or more processors, for instance, central processing units (CPUs). Also, the processor(s) can include functional components used in the integration of program code, such as functional components to fetch program code from locations in such as cache or main memory, decode program code, and execute program code, access memory for instruction execution, and write results of the executed instructions or code. The processor(s) can also include a register(s) to be used by one or more of the functional components. In one or more embodiments, the computing resource(s) can include memory, input/output, a network interface, and storage, which can include and/or access, one or more other computing resources and/or databases, as required to implement the machine-learning processing described herein. The components of the respective computing resource(s) can be coupled to each other via one or more buses and/or other connections. Bus connections can be one or more of any of several types of bus structures, including a memory bus or a memory controller, a peripheral bus, an accelerated graphics port, and a processor or local bus, using any of a variety of architectures. By way of example, but not limitation, such architectures can include the Industry Standard Architecture (ISA), the micro-channel architecture (MCA), the enhanced ISA (EISA), the Video Electronic Standard Association (VESA), local bus, and peripheral component interconnect (PCI). As noted, examples of a computing resource(s) or a computer system(s) which can implement one or more aspects disclosed are described further herein with reference to the figures.

In one embodiment, program code 412 executes a cognitive engine or agent 414 which includes and trains one or more models 416. The models can be trained using training data that can include a variety of types of data, depending on the model and the data sources. In one or more embodiments, program code 412 executing on one or more computing resources 410 applies one or more algorithms of cognitive agent 414 to generate and train the model(s), which the program code then utilizes to perform corpus processing such as disclosed herein. As noted, in one or more embodiments, the corpus processing facilitates assessing and enhancing quality of a corpus of unstructured documents for a specified user task to be performed using, for instance, documents of the corpus. In an initialization or learning stage, program code 412 can train one or more machine learning models 416 using obtained training data that can include one or more corpuses of unstructured documents, one or more sets of quality metrics or quality metrics libraries, one or more user tasks to be performed using unstructured documents, etc., such as described herein.

As noted, data used to train the model(s) (in one or more embodiments) can include a variety of types of data, such as unstructured documents, including the corpus of unstructured documents, quality metrics, various user tasks, or other data associated with training one or more models for a particular function. Program code, in embodiments of the present invention, can perform data analysis to generate data structures, including algorithms utilized by the program code to predict and/or perform an action. As known, machine-learning-based modeling solves problems that cannot be solved by numerical means alone. In one example, program code extracts features/attributes from training data, which can be stored in memory for one or more databases. The extracted features can be utilized to develop a predictor function, h(x), also referred to as a hypothesis, which the program code utilizes as a model. In identifying machine learning model(s) 416, various techniques can be used to select features (elements, patterns, attributes, etc.), including but not limited to, diffusion mapping, principal component analysis, recursive feature elimination (a brute force approach to selecting features), and/or a random forest, to select the attributes related to the particular model. Program code can utilize one or more algorithms to train the model(s) (e.g., the algorithms utilized by program code), including providing weights for conclusions, so that the program code can train any predictor or performance functions included in the model(s). The conclusions can be evaluated by a quality metric. By selecting a diverse set of training data, the program code trains the model to identify and weight various attributes (e.g., features, patterns) that correlate to enhance performance of the model(s).

The model(s) generated by the program code can be self-learning as the program code can update the model based on active processing feedback, as well as feedback received from data related to the user task, domain knowledge, etc. For example, when the program code determines that generated data is not statistically accurate, the program code can utilize a learning agent to update the model to improve predictions in the future. Additionally, when the program code determines that a prediction is incorrect, either based on receiving user feedback through an interface or based on monitoring related to the output(s), the program code updates the model to reflect the inaccuracy of the prediction for the given period of time. Program code comprising a learning agent can cognitively analyze any data deviating from the modeled expectations and adjusts the model to increase the accuracy of the model, moving forward.

In one or more embodiments, program code, executing on one or more processors, can utilize an existing cognitive analysis tool or agent (now known or later developed) to tune the model(s), based on data obtained from one or more data sources. In one or more embodiments, the program code can interface with application programming interfaces to perform a cognitive analysis of obtained data. Specifically, in one or more embodiments, certain application programing interfaces include a cognitive agent (e.g., learning agent) that includes one or more programs, including, but not limited to, natural language classifiers, a retrieve-and-rank service that can surface the most relevant information from a collection of documents, concepts/visual insights, tradeoff analytics, document conversion, and/or relationship extraction. In an embodiment, one or more programs analyze the data obtained by the program code across various sources utilizing one or more of a natural language classifier, retrieve-and-rank application programming interfaces, and tradeoff analytics application programming interfaces.

In one or more embodiments of the present invention, the program code can utilize one or more neural networks to analyze training data and/or collected data to generate an operational machine-learning model. Neural networks are a programming paradigm which enable a computer to learn from observational data. This learning is referred to as deep learning, which is a set of techniques for learning in neural networks. Neural networks, including modular neural networks, are capable of pattern (e.g., state) recognition with speed, accuracy, and efficiency, in situations where datasets are mutual and expansive, including across a distributed network, including but not limited to, cloud computing systems. Modern neural networks are non-linear statistical data modeling tools. They are usually used to model complex relationships between inputs and outputs, or to identify patterns (e.g., states) in data (i.e., neural networks are non-linear statistical data modeling or decision-making tools). In general, program code utilizing neural networks can model complex relationships between inputs and outputs and identified patterns in data. Because of the speed and efficiency of neural networks, especially when parsing multiple complex datasets, neural networks and deep learning provide solutions to many problems in multi-source processing, which program code, in embodiments of the present invention, can utilize in implementing a machine-learning model, such as described herein.

As noted, disclosed herein, in one or more embodiments, are computer-implemented methods, computer systems, and computer program products implementing corpus processing which facilitates identifying and addressing data quality issues in a corpus of unstructured documents to, for instance, be used for a specified task, such as for a specified enterprise machine learning model or system. The corpus processing system disclosed herein presents a framework for automatically assessing and enhancing corpus data quality. Note in this regard that data quality issues may not be apparent from a manual inspection of the documents. It may be that a manual inspection of documents is insufficient and/or impossible in a practical setting. Data quality issues can occur on multiple levels including, for instance, at a word level, a sentence level, a page level, a corpus level, etc. Further, manual selection of standardized metrics on a trial-and-error approach would be too time consuming, and likely produce less than optimal results.

As an example, assume a quality metric repository includes quality metrics for spelling mistakes, language diversity, entropy filtering, sensitive information analysis, class imbalance, bias detection, obviousness, label noise, type coherence, topic coherence, table coherence, text profanity, etc. Depending on the task, different quality metrics may expose issues most significant to the given task. For instance, for the task of text classification, spelling mistakes, language diversity, class imbalance and label noise can be important, while for the task of document filtering, language diversity, sensitive information analysis, type coherence, topic coherence, table coherence, and text profanity may be most important. As another example, for the task of determining semantic textual similarity, spelling mistakes, language diversity, entropy filtering, and obviousness quality metrics from the above list of metrics can be optimal for evaluation.

The corpus processing system and method disclosed herein use the available unstructured electronic documents, available data quality metrics, and a specified user task to be performed as input (in one embodiment), and automatically suggest a relevant subset of data quality metrics from the available data quality metrics, which are best fit for the chosen task. The corpus processing can further utilize user-specified constraints, such as time, model performance, quality score, etc., to provide suitable recommendations of data quality metrics from the identified subset for the given task. In one or more aspects, corpus processing disclosed herein enhances the applicability of quality metrics by automatic metric selection based on the available document dataset, and the task information. The corpus processing system can provide information to a user on various metrics selected for the data, and in one or more implementations, can provide meta information, such as previous performance of those metrics, and time taken to execute a transformation for each metric, so a user can make an informed choice based on time and quality requirements about one or more recommended transformations of documents of the dataset to facilitate the task. In one or more embodiments, the corpus processing automatically determines the applicability and importance of various semantic, syntactic, structural and metadata-related quality metrics for unstructured documents in the corpus based on knowledge of the task to be performed. The system can incorporate one or more user constraints and/or feedback to enable the user to direct or influence data quality metrics selection and automatic remediation based on the constraints or feedback. Given a repository of data quality metrics, the corpus processing system automatically identifies relevant data quality metrics for documents in the corpus for the task.

Figure 5A:
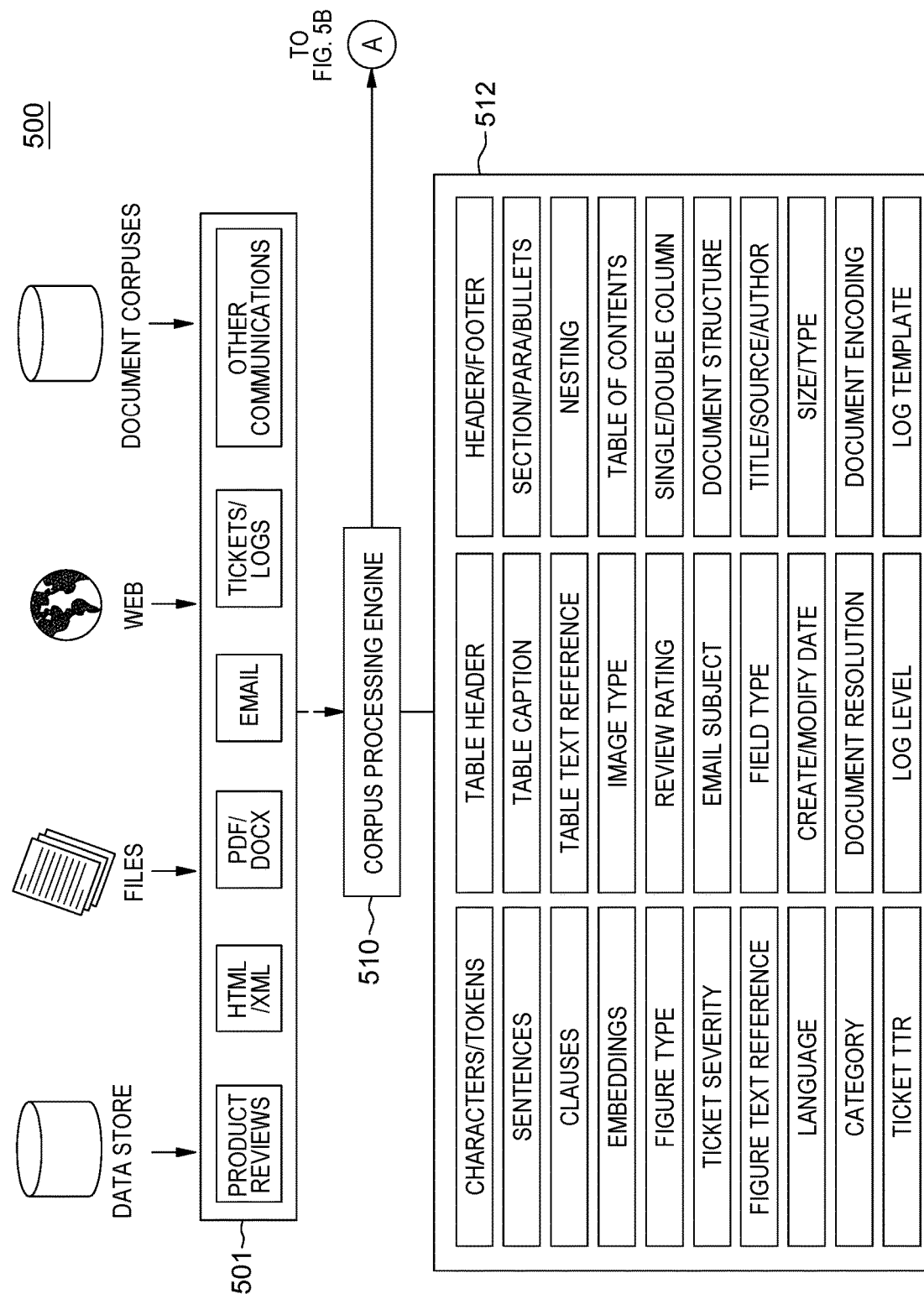
FIG. 5A-5C depict one embodiment of a corpus processing system and workflow, in accordance with one or more aspects of the present invention.
Figure 5B:
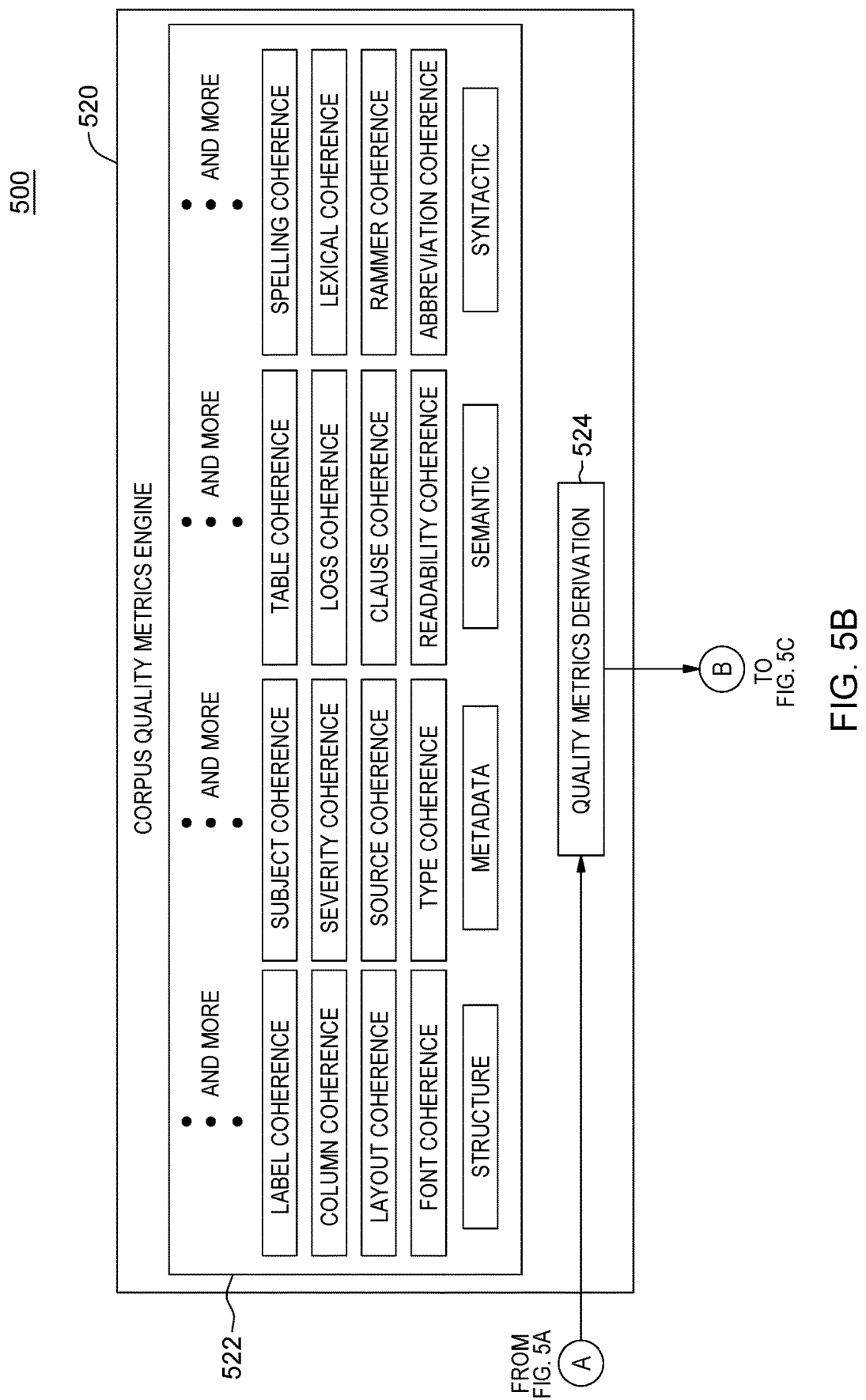
Figure 5C:
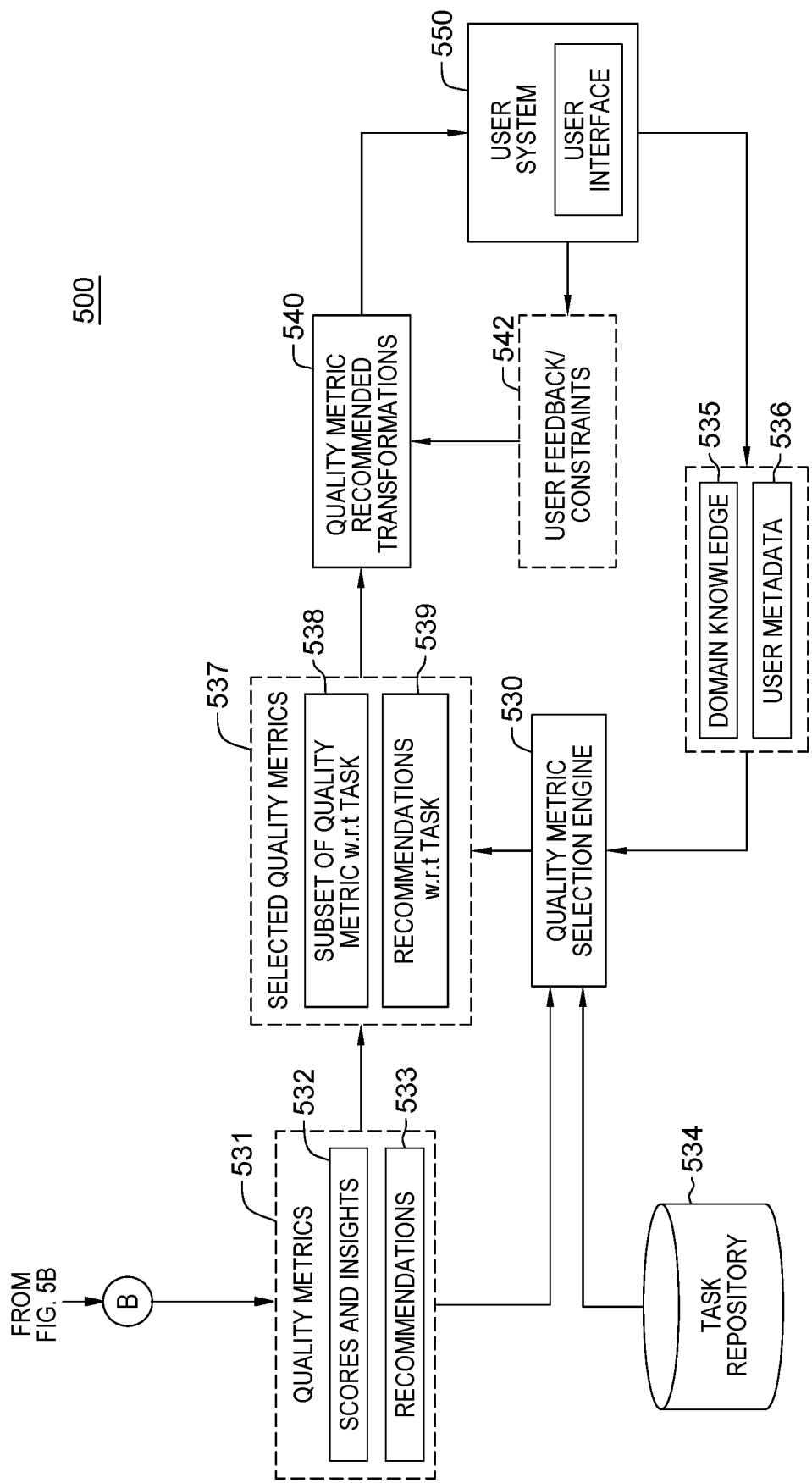

FIGS. 5A-5C depict one embodiment of a corpus processing system and workflow, in accordance with one or more aspects of the present invention.

Referring initially to FIG. 5A, in one or more implementations, a corpus containing a variety of input documents 501 can be collected, obtained, received, etc., from one or more data sources, such as a data store, one or more files, one or more Internet searches, one or more electronic document files, etc. Documents 501 represent a corpus of unstructured documents that are input to a corpus processing engine 510 of the corpus processing system 500. In one or more implementations, the unstructured documents can include, by way of example, one or more product reviews, HTML/XML documents, PDF/DOCX documents, email, tickets/logs, and/or communications, etc. Document data obtained from the data source(s) can be of various types and can contain various information relating, for instance, to a particular enterprise, topic, etc. In one or more implementations, a wide range of information data, or document data, is extracted from the obtained documents. For instance, extracted information for SENTENCES can include sentences present in the document(s), for TABLE HEADERS can include headers of any tables present in the document(s), for HEADER/FOOTER can contain headers and footers present in the document(s), for DOCUMENT RESOLUTION can contain DPI of the document(s) when the document(s) includes one or more images, etc. Note that the various types of document data 512 identified in FIG. 5A that can be extracted are presented by way of example only.

As illustrated in FIG. 5B, in one or more implementations, a corpus quality metrics engine 520 is provided as part of corpus processing system 500 to apply a set of quality metrics 522 to the document data obtained in order to ascertain or derive 524 a set of quality metrics scores for documents of the corpus. In the example of FIG. 5B, the set of quality metrics 522 are in a metric repository, with the metrics categorized into structure metrics, metadata metrics, semantic metrics, and syntactic metrics, by way of example. Structure metrics are metrics based on the structure of the document. For instance, FONT COHERENCE measures the variety of fonts present in the documents, and LAYOUT COHERENCE measures the variety of the layouts (document dimensions) present in the corpus of documents. Metadata metrics are based on metadata of the documents. As an example, SEVERITY COHERENCE measures the variety of severity of ticket data and TYPE COHERENCE measures the variety of document types in the corpus. Semantic metrics are based on semantic nature of the document corpus. As an example, READABILITY COHERENCE measures the variety and complexity of text present in the documents. Syntactic metrics are based on syntactic properties of the text present in the documents. As an example, GRAMMAR COHERENCE measures the grammatical correctness of the documents, and SPELLING COHERENCE measures the correctness of spelling in the documents.

Note that the set of quality metrics 522 can be from a repository of existing quality metrics and/or of user-defined quality metrics, and can be generic in nature. In one embodiment, all the quality metrics can be computed, but may not equally applicable to different corpuses of documents, or across all the documents within a given corpus. For instance, quality metrics on a figure-to-text ratio can be useful for a product-description-type document, but not for a FAQ-type document. In one or more embodiments, some of the metrics can add noise to measure the overall quality of the documents. Currently, there is no supervision available to select a quality metric over another metric, or learn its importance for a document. Different combinations of quality metrics can be very large, and to apply all the combinations to all the documents is computationally infeasible. The corpus processing systems and methods disclosed herein advantageously integrate the downstream task(s) to be performed on the documents with the automated selection of the best quality metrics for the task(s).

In one or more implementations, since there are a large number of quality metrics available, the metrics can be categorized into various groups, such as structural, syntactic, etc., and these categories provide clues as to the type of document property that the metric is relying on. Metric properties can include a variety of attributes including, for instance, a name of the quality metric, a short description of what the metric does, a level at which the metric operates (for instance, page, word, sentence, corpus, etc.), a task for the type of metric this metric is applicable, for instance, classification, clustering, generic, etc., a tag indicating what type of metric it is, for instance, semantic (outliers), structural (portrait versus landscape), syntactic (spelling mistakes), metadata (document type, creation date, etc.), a mode which indicates how the metric applies transformations, that is, whether batch or individual, a detection routine, that is, a routine to identify the issue of the metric and compute the metric score, and a mitigation routine, that is, a routine to remediate the identified issue. Metric classifications can be generic or task-specific. Where generic, irrespective of the task, the metric is applicable, for instance, DATA CLEANING. Task-specific metrics include metrics that are applicable only for a specified or selected task, for instance, LABEL NOISE. Certain metrics can be batch-processed, while others individually processed. Batch-processing metrics include, for instance, LABEL NOISE, LAYOUT COHERENCE, etc., and individual processing metrics include SPELLING MISTAKES, FONT COHERENCE, etc. Individual processing metrics affect the time required to mitigate identified quality issues to a greater extent than batch-processing metrics.

As illustrated in FIG. 5C, corpus processing system 500 further includes a quality metrics selection engine 530, which receives as input quality metrics 531, including scores and insights 532 and recommendations 533, from corpus quality metrics engine 520 (FIG. 5B). In one or more implementations, quality metrics scores indicate the severity of the issue. For instance, assume a score is in the range of 0 to 1, and a higher score for a metric indicates high-quality, and vice-versa. For instance, assume the score for FONT COHERENCE is 0.15, then fonts used in the documents are of different type, and if the value is 0.9, then similar fonts are used in most of the documents. Quality metric insights can provide examples of different fonts identified in the documents, and examples for each font so that the user understands the reason for a low and/or a high score for a particular metric. Recommendations 533 can be actionable suggestions provided by which the score for a particular metric can be increased. For instance, the recommendation for FONT COHERENCE can be to change the font type of document x, y, z to Arial, since the majority of the documents in the corpus have Arial as their font type.

As illustrated in FIG. 5C, and described herein, quality metrics selection engine 530 also receives as input the selected task from, for instance, a task data repository 534. Output from quality metrics selection engine can be a selected quality metrics 537, which are task-related quality metrics including a subset of quality metrics with respect to the task 538, and recommendations with respect to the task 539.

Figure 6:
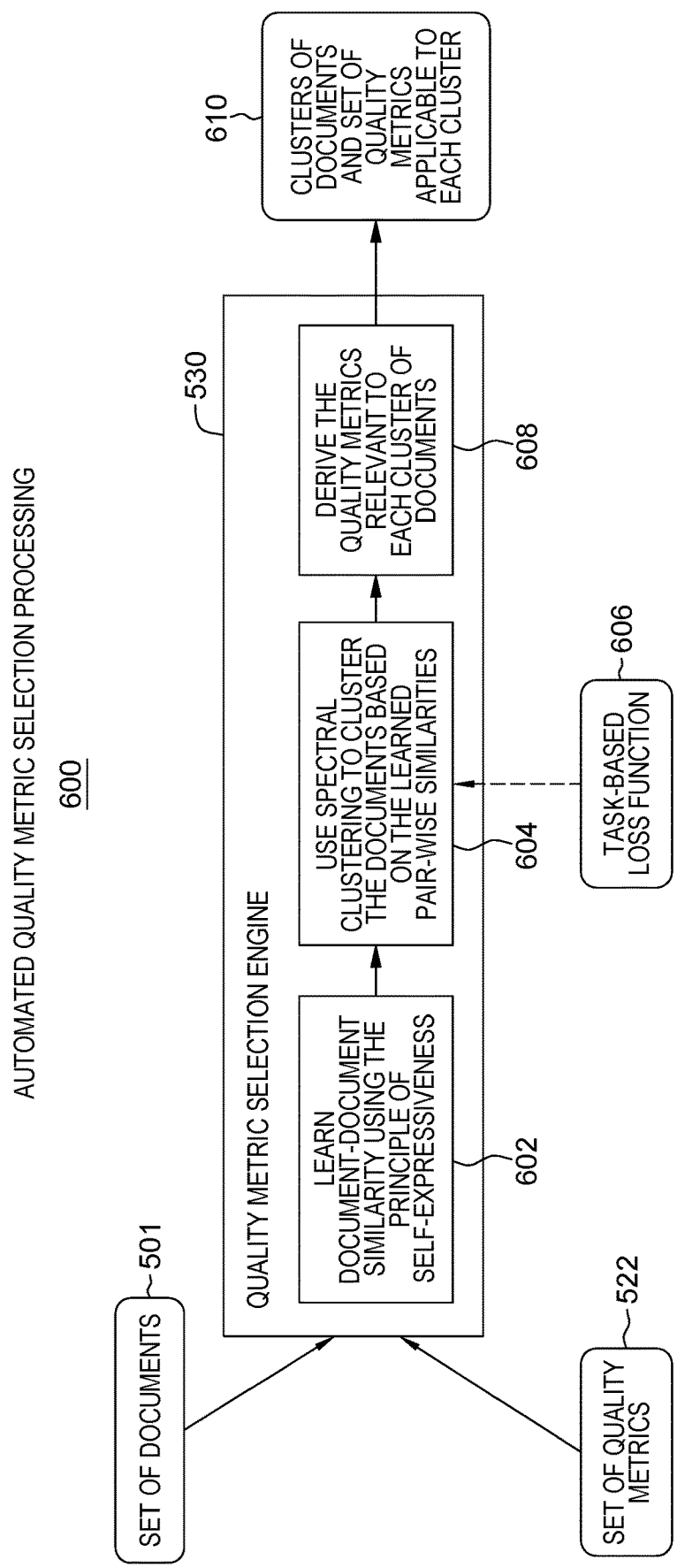
FIG. 6 depicts one embodiment of quality metric selection engine processing, in accordance with one or more aspects of the present invention.

FIG. 6 depicts one embodiment of automated quality metrics selection processing performed by quality metrics selection engine 530. The processing is to select a correct or optimal subset of task-relevant quality metrics for the given document corpus and task that needs to be performed. Quality metrics selection engine 530 references the set of unstructured documents 501 and a set of quality metrics 522, and learns document-to-document pair-wise similarities based on self-expressiveness 602. Spectral clustering is used to cluster documents of the corpus based on the learned pair-wise similarities 604, as well as a task-based loss function 606. The quality metrics relevant to each cluster of document are derived 608, with the clusters of documents and sets of quality metrics applicable to each cluster being output 610. In one embodiment, the clusters are formed based on the objective of the specified task, along with the document similarity and metrics scores as input, as described further below. The cluster for which the estimated performance on the downstream task is maximized can be the recommended cluster as output. As noted, in addition to optimizing performance based on the specified task, the user can provide further constraints, such as runtime required for a transformation, in order to further quality the process. For instance, where runtime is insufficient, a different cluster can be recommended and/or the set of quality metrics recommended for the cluster can be reduced. Note that, in this example, the desired subset of task-relevant quality metrics is a respective set of document quality metrics of one cluster of documents selected based on the specified user task, where the cluster of documents are, or are to be included with, the documents to be used for the specified task.

By way of detailed example, automated selection of quality metrics can be integrated with learning of a task to be performed by denoting documents by $d_1, d_2, \ldots d_n$ in the corpus. Assume that $q_1, q_2, \ldots q_m$ are the quality metrics. Assume further that $Q \in \mathbb{R}^{m \times n}$ is the matrix whose $(i, j)^{th}$ entry denotes the value of the quality metric $q_i$ on document $d_j$. A downstream task-specific loss function $L_{down}$ is included with parameters $\theta$ (for example, classification loss for document classification), if it is available. $L_{down}$ can potentially be a function of $Q$. To understand the relevant quality metrics for each document, the mutual dependency between quality metrics and the documents is determined. The goal is to obtain each subset of documents and the corresponding subset of active quality metrics.

Essentially, if for a subset of documents only $\{q_i | i \in I \subset [m]\}$ is the subset of active documents, then they are linearly independent to other quality metrics outside of that subset. Thus, using the principle of self-expressiveness, we seek to minimize the following, where $C \in \mathbb{R}^{n \times n}$:

$$\min_{C,\theta} L_{down} + \|C\|_1 \text{ s.t., } Q = QC, \text{diag}(Q) = 0. \quad (1)$$

Due to noise in the value of the quality metric (can be because of the PDF parser, etc.), one constraint is relaxed and the below is solved:

$$\min_{C,\theta} L_{down} + \|C\|_1 + \|Q - QC\|_F \text{ s.t., diag}(Q) = 0. \quad (2)$$

The above can be solved using standard optimization technique such as projected gradient descent.

Because if the L-1 sparsity constraint, $C \in \mathbb{R}^{n \times n}$ will block diagonal matrix. $C \in \mathbb{R}^{n \times n}$ can be considered as an affinity matrix and can be used with spectral clustering to retrieve the documents which belong to one block of this diagonal matrix. For each cluster C, consider the documents $d_j \in C$, and the variance of each quality metric $q_i$ on these documents. If the variance is more than a set threshold, the quality metric is selected for the cluster C, otherwise, it is discarded.

The output is a subset of quality metrics for each cluster of documents (where the subset of quality metrics can vary over different clusters of documents).

Continuing with FIG. 5C, quality metrics selection engine 530 provides selected quality metrics 537, which include the subset of task-relevant quality metrics 538 and task-relevant recommendations 539. For instance, the subset of quality metrics with respective tasks 538 and recommendations with respective tasks 539 comprise metrics and recommendations selected based on the task planned to be applied to the documents. Quality-metric-recommended transformations 540 can automatically apply the recommendations provided by the metric to improve the quality score. In one or more embodiments, quality-metric-recommended transformations 540 automatically transforms, at least in part, documents of the corpus to remediate one or more identified issues with the documents (e.g., with a cluster of documents). The automatically transforming results in remediated documents tuned for the specified user task, with the one or more issues identified by the subset of task-relevant quality metrics having been addressed. In one or more embodiments, the selected quality metrics and/or the remediated documents can be provided to a user device or system 550 for display or use, for instance, to facilitate performing the specified task, such as to train a machine learning model on the documents, including the remediated documents. In one or more embodiments, user feedback and/or constraints 542 can be used to control the recommended transformations 540 so that the user can, for instance, select or direct the one or more transformations to clean the input data as desired (e.g., to improve performance of the machine learning model to be trained, as the quality of data is improved compared to the raw input data). Also note that a quality metrics selection engine 530 can use domain knowledge 535 and/or user metadata 536, that is, user-based metadata, in automatically selecting the subset of task-relevant quality metrics from the applied set of quality metrics. This can be in addition to the automated approach noted above that takes into account the metric scores, as well as the user task. In one or more implementations, the system can learn to incorporate domain knowledge into the metric selection process based, for instance, on the user metadata. Domain knowledge can be captured as a structured JSON of key-value pairs, where a key corresponds to a metric and a value corresponds to a user input on how important the metric is (e.g., high, medium, low). The user metadata can correspond to metadata identifying the user's role, years of experience, domain of expertise, etc.

Figure 7:
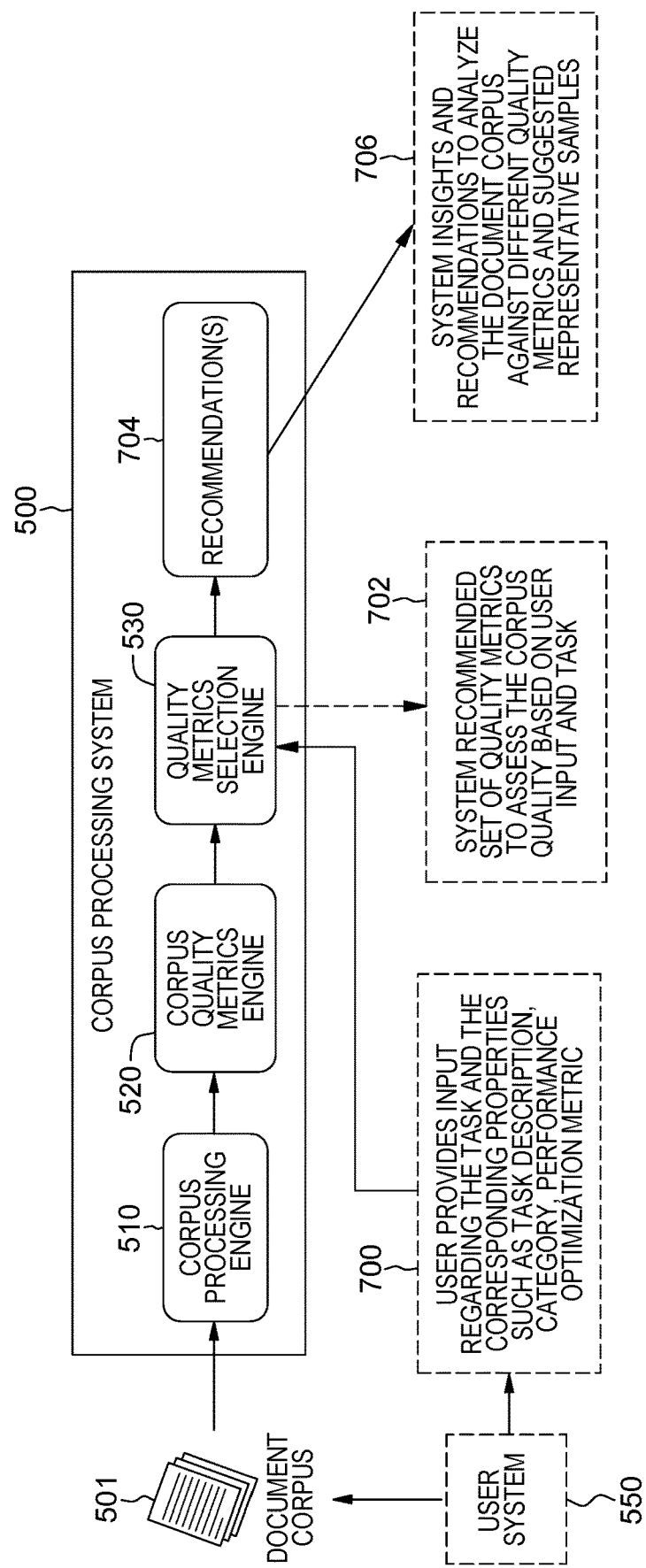
FIG. 7 depicts one example of corpus processing system workflow, in accordance with one or more aspects of the present invention.

FIG. 7 depicts one example of corpus processing system workflow, in accordance with one or more aspects of the present invention. In this example, the user task is to identify distinct-looking layouts in the documents, and identify representative samples that capture the distinct document elements. The user system 550 can provide input regarding the task and the corresponding properties, such as task description, category, performance optimization metric 700, as well as the electronic document corpus, or identification of electronic documents to use a input to corpus processing system 500. Corpus processing engine 510 references the document corpus and obtains document data from the documents, such as described above in connection with FIG. 5A. Corpus quality metrics engine 520 applies a set of quality metrics to the document data obtained in order to ascertain or derive a set of quality metrics scores for the documents of the corpus, such as described above in connection with FIG. 5B. Quality metrics selection engine 530 automatically selects a subset of task-relevant quality metrics from the set of quality metrics using the set of quality metrics scores and the specified tasks, such as described above in connection with FIGS. 5C & 6. Quality metrics selection engine 530 utilizes, in one embodiment, a system-recommended set of quality metrics to assess the corpus quality based on the user input and task 702. Output from quality metrics selection engine 530 are one or more recommendations 704, which can include system insights and recommendations to analyze the document corpus against different quality metrics and suggested representative samples 706. In one or more implementations, the recommendations can relate to increasing the quality metrics score, that is, relating to the details of documents belonging to each subset, cluster or group of documents.

Figure 8:
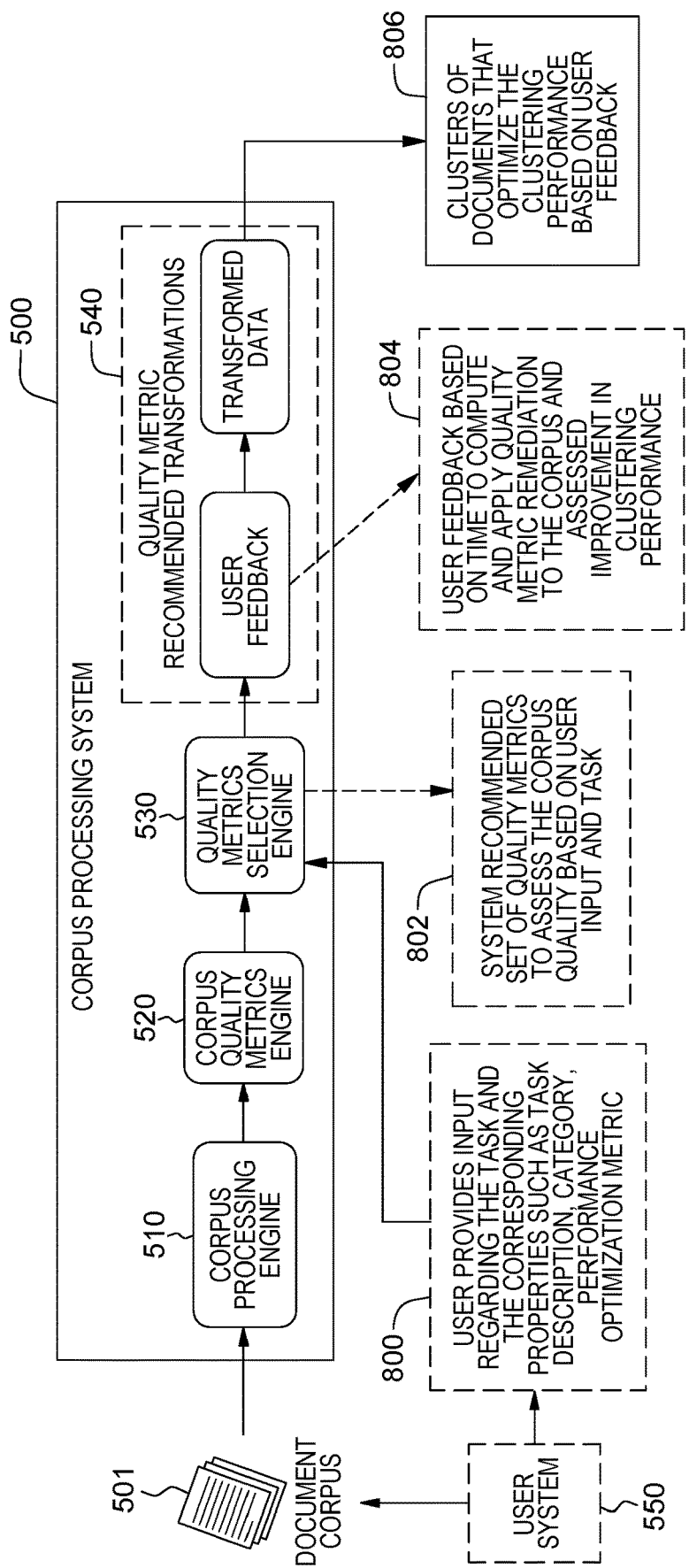
FIG. 8 depicts another example of corpus processing system workflow, in accordance with one or more aspects of the present invention.

FIG. 8 depicts another example of corpus processing system workflow, in accordance with one or more aspects of the present invention. In this example, user system 550 provides input regarding the task and the corresponding properties, such as task description, category, performance optimization metrics, etc., 800 to corpus processing system 500, which also obtains or references an electronic document corpus 501, which can be provided or identified by user system 550. Corpus processing engine 510 references the corpus of documents to obtain document data extracted from the obtained documents. Corpus quality metrics engine 520 applies a set of quality metrics to the document data to obtain a set of quality metrics scores for the unstructured documents of the corpus, and quality metrics selection engine 530 receives as input the quality metrics scores and recommendations, and provides a system-recommended set of quality metrics to assess the corpus quality based on the user input and task 802. Quality metrics recommended transformations 540 can be based on user feedback, where the user feedback can be based (for instance) on time to compute and apply quality metrics remediation to the corpus and assess improvement in clustering performance 804, in one example. The transformed data can include remediated documents, such as one or more clusters of documents that optimize the clustering performance based on user feedback 806. In one specific example, assume a user requires document cleaning to be performed within 30 minutes, then the corpus processing system determines the best subset of metrics that can be selected to obtain the best quality output within the given time limit.

In another example of corpus processing system workflow where the specified task is a classification task, the corpus processing engine collects support tickets with tags indicating the respective categories. The quality metrics selection engine selects metrics, in one example, based on time and performance reward, where the user system can selectively set time constrains for arriving at the quality metrics sequence. For instance, in one specific example only, selection of metrics based on time and performance reward can include: LABEL COHERENCE, 50 minutes, +5% (YES—meets time constraint); LABEL BALANCE, 30 minutes, +7% (YES); LABEL NOISE, 2 hours, +0.5% (NO—fails time constraint); DATA CLEANING, 20 minutes, +2% (YES); OUTLIERS, 2 hours, +0.2% (NO); BIAS, 2 hours, −2% (NO); and SENSITIVE INFORMATION, 3 hours, 0% (NO), which results in a sequencing of metrics as follows: DATA CLEANING—LABEL COHERENCE—LABEL NOISE—LABEL BALANCE, with the sequence having been selected based, in part, on the user feedback. The sequence of metrics can then be used to improve quality of the document(s), resulting in clean data. By way of further example, for the selected metrics, LABEL NOISE can be used for a classification task in batch mode, and have an associated semantic tag, with the operational level being a data sample. LABEL COHERENCE can be for a classification task with batch mode processing and an associated semantic tag, with the operational level being data sample. DATA CLEANING can be for a generic task, with an individual processing mode and a syntactic tag associated, with the operational level being at the word level. DATA OUTLIERS can be for a classification task with batch mode processing and an associated semantic tag, with the operational level being a data sample. With each metric, a respective detection routine and mitigation routine can also be provided.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating processing within a computing environment, the computer-implemented method comprising:
   electronically transforming electronic documents of a corpus of unstructured electronic documents to facilitate computing environment processing for a specified task to be performed, the electronically transforming comprising:
   referencing, by a corpus processing engine, the corpus of unstructured electronic documents to obtain electronic document data, the corpus of unstructured electronic documents being, at least in part, for the specified task to be performed;
   applying, by a corpus quality metrics engine, a set of quality metrics to the electronic document data to obtain a set of quality metrics scores for the unstructured electronic documents of the corpus;
   automatically selecting, by a quality metrics selection engine, a subset of task-relevant quality metrics, from the set of quality metrics using the set of quality metrics scores, which are a best fit for the specified task;
   automatically transforming, at least in part, multiple electronic documents of the corpus to remediate one or more identified issues with the multiple electronic documents, the automatically transforming generating remediated electronic documents tuned for the specified task, the one or more issues being identified by the subset of task-relevant quality metrics which are a best fit for the specified task; and
   providing the remediated electronic documents to facilitate computing environment processing for the specified task to be performed.

2. The computer-implemented method of claim 1, wherein the automatically selecting, by the quality metrics selection engine, the subset of task-relevant quality metrics further comprises automatically generating one or more quality metric recommended transformations to improve one or more quality metrics scores of the set of quality metric scores for the specified task, and wherein the automatically transforming the multiple electronic documents comprises using the one or more quality metric recommended transformations to remediate the one or more identified issues with the multiple electronic documents.

3. The computer-implemented method of claim 1, wherein the automatically selecting, by the quality metrics selection engine, further comprises:
   referencing the corpus of unstructured documents and the set of quality metrics to learn document-to-document pair-wise similarities based on self-expressiveness;
   using spectral clustering to cluster electronic documents of the corpus based on the learned pair-wise similarities; and
   deriving one or more quality metrics relevant to each cluster of electronic documents to obtain for each cluster of electronic documents a respective set of document quality metrics applicable to that cluster of electronic documents, the subset of task-relevant quality metrics being one respective set of document quality metrics of a cluster of electronic documents selected based on the specified task.

4. The computer-implemented method of claim 3, wherein using the spectral clustering further comprises using a task-based loss function in clustering the electronic documents of the corpus, the task-based loss function being based on the specified task.

5. The computer-implemented method of claim 1, wherein the automatically selecting, by the quality metrics selection engine, further comprises selecting the subset of task-relevant quality metrics from the applied set of quality metrics using incorporated domain knowledge and user-based metadata, the specified task being a specified user task.

6. The computer-implemented method of claim 1, wherein referencing, by the corpus processing engine, the corpus of unstructured electronic documents to obtain document data comprises extracting information data from the corpus of unstructured electronic documents to obtain the document data.

7. The computer-implemented method of claim 1, wherein the corpus processing engine, the corpus quality metrics engine, and the quality metrics selection engine, each comprise a respective trained machine learning model.

8. The computer-implemented method of claim 1, wherein the provided remediated electronic documents are a training dataset for use by a user in training a machine learning model, the specified task comprising training the machine learning model for a particular application.

9. The computer-implemented method of claim 1, further comprising receiving user feedback data, and based on receiving the user feedback data, automatically filtering the subset of task-relevant quality metrics to obtain a filtered subset of relevant quality metrics, and automatically remediating the one or more issues with the multiple electronic documents using the filtered subset of relevant quality metrics to obtain the remediated electronic documents tuned for the specified task based on the user feedback data.

10. A computer system for facilitating processing within a computing environment, the computer system comprising:
a memory; and
at least one processor in communication with the memory, where the computer system is configured to perform a method, said method comprising:
electronically transforming electronic documents of a corpus of unstructured electronic documents to facilitate computing environment processing for a specified task to be performed, the electronically transforming comprising:
referencing, by a corpus processing engine, the corpus of unstructured electronic documents to obtain electronic document data, the corpus of unstructured electronic documents being, at least in part, for the specified task to be performed;
applying, by a corpus quality metrics engine, a set of quality metrics to the electronic document data to obtain a set of quality metrics scores for the unstructured electronic documents of the corpus;
automatically selecting, by a quality metrics selection engine, a subset of task-relevant quality metrics, from the set of quality metrics using the set of quality metrics scores, which are a best fit for the specified task;
automatically transforming, at least in part, multiple electronic documents of the corpus to remediate one or more identified issues with the multiple electronic documents, the automatically transforming generating remediated electronic documents tuned for the specified task, the one or more issues being identified by the subset of task-relevant quality metrics which are a best fit for the specified task; and
providing the remediated electronic documents to facilitate computing environment processing for the specified task to be performed.

11. The computer system of claim 10, wherein the automatically selecting, by the quality metrics selection engine, the subset of task-relevant quality metrics further comprises automatically generating one or more quality metric recommended transformations to improve one or more quality metrics scores of the set of quality metric scores for the specified task, and wherein the automatically transforming the multiple electronic documents comprises using the one or more quality metric recommended transformations to remediate the one or more identified issues with the multiple electronic documents.

12. The computer system of claim 10, wherein the automatically selecting, by the quality metrics selection engine, further comprises:
referencing the corpus of unstructured documents and the set of quality metrics to learn document-to-document pair-wise similarities based on self-expressiveness;
using spectral clustering to cluster electronic documents of the corpus based on the learned pair-wise similarities; and
deriving one or more quality metrics relevant to each cluster of electronic documents to obtain for each cluster of electronic documents, a respective set of document quality metrics applicable to that cluster of electronic documents, the subset of task-relevant quality metrics being one respective set of document quality metrics of a cluster of electronic documents selected based on the specified task.

13. The computer system of claim 12, wherein using the spectral clustering further comprises using a task-based loss function in clustering the electronic documents of the corpus, the task-based loss function being based on the specified task.

14. The computer system of claim 10, wherein the automatically selecting, by the quality metrics selection engine, further comprises selecting the subset of task-relevant quality metrics from the applied set of quality metrics using incorporated domain knowledge and user-based metadata, the specified task being a specified user task.

15. The computer system of claim 10, wherein the corpus processing engine, the corpus quality metrics engine, and the quality metrics selection engine, each comprise a respective trained machine learning model.

16. The computer system of claim 10, further comprising receiving user feedback data, and based on receiving the user feedback data, automatically filtering the subset of task-relevant quality metrics to obtain a filtered subset of relevant quality metrics, and automatically remediating the one or more issues with the multiple electronic documents using the filtered subset of relevant quality metrics to obtain the remediated electronic documents tuned for the specified task based on the user feedback data.

17. A computer program product for facilitating processing within a computing environment, the computer program product comprising:
- one or more computer-readable storage media and program instructions collectively stored on the one or more computer-readable storage media to perform a method comprising:
  - electronically transforming electronic documents of a corpus of unstructured electronic documents to facilitate computing environment processing for a specified task to be performed, the electronically transforming comprising:
    - referencing, by a corpus processing engine, the corpus of unstructured electronic documents to obtain electronic document data, the corpus of unstructured electronic documents being, at least in part, for the specified task to be performed;
    - applying, by a corpus quality metrics engine, a set of quality metrics to the electronic document data to obtain a set of quality metrics scores for the unstructured electronic documents of the corpus;
    - automatically selecting, by a quality metrics selection engine, a subset of task-relevant quality metrics, from the set of quality metrics using the set of quality metrics scores, which are a best fit for the specified task;
    - automatically transforming, at least in part, multiple electronic documents of the corpus to remediate one or more identified issues with the multiple electronic documents, the automatically transforming generating remediated electronic documents tuned for the specified task, the one or more issues being identified by the subset of task-relevant quality metrics which are a best fit for the specified task; and
    - providing the remediated electronic documents to facilitate computing environment processing for the specified task to be performed.

18. The computer program product of claim 17, wherein the automatically selecting, by the quality metrics selection engine, the subset of task-relevant quality metrics further comprises automatically generating one or more quality metric recommended transformations to improve one or more quality metrics scores of the set of quality metric scores for the specified task, and wherein the automatically transforming the multiple electronic documents comprises using the one or more quality metric recommended transformations to remediate the one or more identified issues with the multiple electronic documents.

19. The computer program product of claim 17, wherein the automatically selecting, by the quality metrics selection engine, further comprises:
- referencing the corpus of unstructured documents and the set of quality metrics to learn document-to-document pair-wise similarities based on self-expressiveness;
- using spectral clustering to cluster electronic documents of the corpus based on the learned pair-wise similarities; and
- deriving one or more quality metrics relevant to each cluster of electronic documents to obtain for each cluster of electronic documents a respective set of document quality metrics applicable to that cluster of electronic documents, the subset of task-relevant quality metrics being one respective set of document quality metrics of a cluster of electronic documents selected based on the specified task.

20. The computer program product of claim 19, wherein using the spectral clustering further comprises using a task-based loss function in clustering the electronic documents of the corpus, the task-based loss function being based on the specified task.

* * * * *